United States Patent [19]

Wada et al.

[11] Patent Number: 4,486,791

[45] Date of Patent: Dec. 4, 1984

[54] APPARATUS FOR OPTICALLY REPRODUCING SIGNALS RECORDED ON A ROTATING RECORDING MEDIUM

[75] Inventors: Yoshiyo Wada; Hisao Kinjo, both of Yokohama; Ichiro Ueno, Isehara; Yoshihiko Honjo, Ayase; Kazuo Tatsuguchi, Yokohama; Juichi Shikunami, Sagamihara, all of Japan

[73] Assignee: Victor Company of Japan, Ltd., Yokohama, Japan

[21] Appl. No.: 374,781

[22] Filed: May 4, 1982

Related U.S. Application Data

[63] Continuation-in-part of Ser. No. 363,120, is a continuation of Ser. No. 24,594, Mar. 28, 1979, abandoned.

[30] Foreign Application Priority Data

Mar. 29, 1978 [JP] Japan ................................ 53-35483

[51] Int. Cl.³ .......................... H04N 5/85; G11B 7/00
[52] U.S. Cl. ...................................... 358/342; 369/45
[58] Field of Search .................... 358/342; 369/43–47, 369/111, 112, 109, 275, 50; 360/77; 250/201

[56] References Cited

U.S. PATENT DOCUMENTS

| | | | |
|---|---|---|---|
| 3,158,846 | 11/1964 | Silverman | 340/174.1 |
| 3,396,243 | 8/1968 | McDaniel | 250/201 |
| 3,673,412 | 6/1972 | Olson | 369/44 X |
| 3,974,327 | 8/1976 | Van Dijk | 369/45 |
| 4,110,607 | 8/1978 | Honjo et al. | 250/201 |
| 4,125,859 | 11/1978 | Oshida et al. | 369/112 X |
| 4,135,207 | 1/1979 | Greve et al. | 369/45 |
| 4,179,708 | 12/1979 | Sheng et al. | 369/112 |
| 4,321,621 | 3/1982 | Kinjo et al. | 369/43 X |
| 4,322,836 | 3/1982 | Kinjo et al. | 369/43 |
| 4,327,430 | 4/1982 | Wada et al. | 369/43 |
| 4,331,976 | 5/1982 | Kinjo et al. | 369/43 X |

Primary Examiner—Donald E. McElheny, Jr.
Attorney, Agent, or Firm—Louis Bernat

[57] ABSTRACT

An optical apparatus reproduces an information signal recorded as pits along track turns of a rotating recording medium. At least one kind of reference signal is recorded along and overlapping the lateral edges of the adjacent track turns of the information signal. A light source projects a first light beam onto the surface of the recording medium to simultaneously reproduce the information and reference signals. A detector responds to reflections of the projected light which includes and reproduces the information signal and the reference signal. The optical system is controlled so that the center of the light beam coincides with the centerline of the track. A circuit separates the reference signal from the total reproduced signal and produces a tracking control signal in response thereto.

6 Claims, 11 Drawing Figures

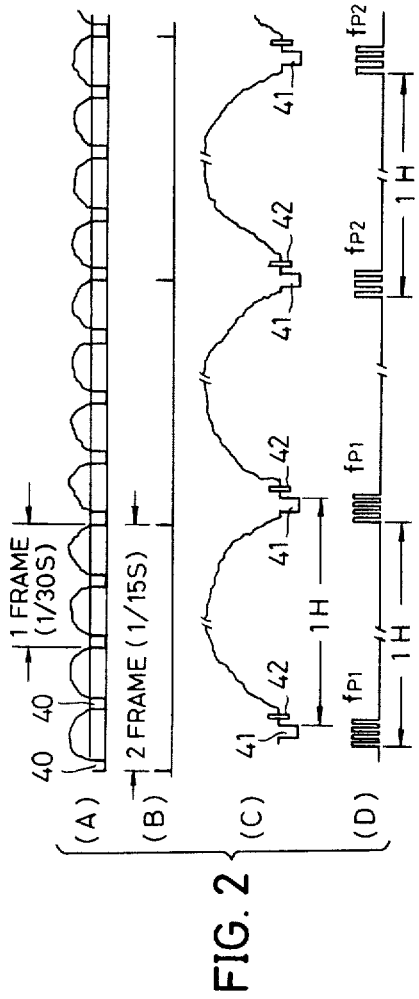
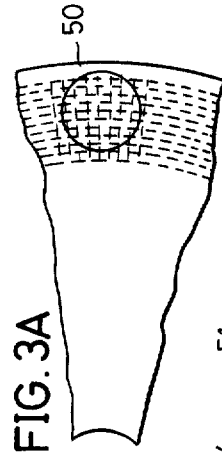
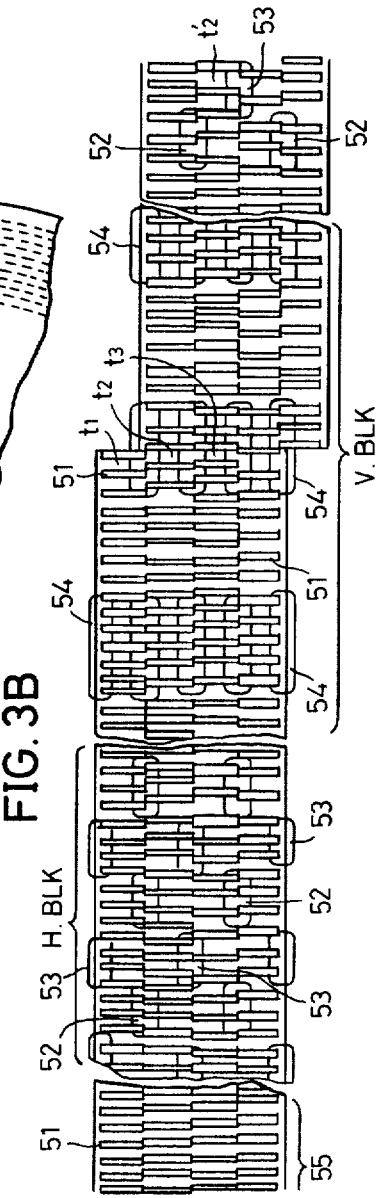
FIG. 2
FIG. 3A
FIG. 3B

APPARATUS FOR OPTICALLY REPRODUCING SIGNALS RECORDED ON A ROTATING RECORDING MEDIUM

The present application is a continuation-in-part application of U.S. patent application Ser. No. 363,120, filed Mar. 29, 1982, which in turn is a streamlined continuation application of U.S. patent application Ser. No. 24,594, filed Mar. 28, 1979 (now abandoned).

BACKGROUND OF THE INVENTION

The present invention relates generally to apparatuses for optically reproducing information signals from rotating recording mediums. More particularly, the invention relates to an optically reproducing appratus which, when optically reproducing an information signal from a rotating recording medium on which a pilot or reference signal for tracking control is also recorded together with information signal, simultaneously reproduces also the reference signal and, in response to the reference signal, carries out tracking control of the optically reproducing mechanism.

In general, in an apparatus for optically reproducing an information signal from a rotating recording medium, a light beam is projected onto the disc-shaped rotating recording medium (hereinafter referred to simply as "disc") on which the information signal has been recorded as variations of geometrical shapes on the recording surface of the disc. The light thereby reflected by the recording surface or transmitted through the recording surface is received by light-receiving means, and the light variations responsive to the variations of the geometrical shape of the recording surface are detected and converted into the information signal as the reproduced signal.

An advantageous feature of this optically reproducing apparatus is that it entails no problems whatsoever relating to abrasive wear of the reproducing tracing element and the disc in contrast to reproducing apparatuses of the type wherein a reproducing tracing element is caused to trace by sliding over the disc surface, and the signal recorded as variations in the geometrical shape of the disc surface is thereby picked up as capacitance variations or piezoelectrical variations.

At the time of this optical reproduction, it is necessary to carry out so-called tracking control so that the reproducing light beam will trace accurately and positively the recording track of the disc recording suface.

Among the optically reproducing apparatuses known heretofore, there has been an apparatus of an organization as described below. One example of the disc to be reproduced by this known optically reproducing apparatus has unrecorded parts called "guard bands" interposed between adjacent track turns of a spiral track or circular tracks of concentric form along which the information signal is recorded on the disc as variations of geometrical shape. In an apparatus for reproducing this disc, a single light beam from a light source is divided by the use of a diffraction grating into three light beams, one of which is projected as a reproducing beam onto the center of the recorded track, while the other two light beams are projected as tracking beams onto the disc so as to be positioned on opposite sides of the reproducing beam in the width direction and longitudinal direction of the track. The reproducing apparatus further detects this pair of tracking beams reflected from the disc, thereby detecting any deviation of the reproducing beam center from the center of the recorded track, and carries out tracking control by so controlling the optical system that these two centers coincide.

In this known reproducing apparatus, however, since a pair of beams separate from the reproducing beam is used for the purpose of tracking control, the optical system, including means for dividing a single light beam into three beams, is complicated. Furthermore, the detectors for detecting the beams for tracking control are also required as a pair, whereby the entire organization is complicated. In addition, since a single light beam is divided into three light beams, there arise problems such as a drop in the quantity of light of the reproducing beam. A further problem arises also in the disc to be reproduced by this reproducing apparatus in that, since unrecorded guard bands are provided between adjacent track turns, the efficiency of utilization for recording of the recording surface is poor.

SUMMARY OF THE INVENTION

Accordingly, it is a general object of the present invention to provide a novel and useful optically reproducing apparatus for reproducing an information signal from a rotating recording medium.

Another and specific object of the invention is to provide an optically reproducing apparatus for reproducing a rotating recording medium on which an information signal is recorded in which apparatus tracking control of the reproducing beam can be accomplished with means of simple organization. In the apparatus of the invention, a special light beam is used for tracking control, whereby the organization is simple. Furthermore, in the rotating recording medium to be reproduced by the apparatus of the invention, each recording track turn is recorded substantially in close contact with the adjacent track turn or in partially overlapping state relative to the adjacent track turn, whereby the efficiency of utilization of the disc surface for recording is high.

Still another object of the present invention is to provide an optically reproducing apparatus for reproducing a rotating recording medium on which an information signal is recorded, in which a lens for reproduction having a depth of focus approximately equal to or smaller than twice the depth of pits of tracks recorded on the rotating recording medium is used as the objective lens, so that the focusing point of a reproduced light beam approximately coincides with the upper surface of the rotating recording medium or the bottom surfaces of the pits. According to the apparatus of the present invention, fine reproduction can be performed without introducing second-order harmonic distortion, since the difference in luminous energy between the reflected light from the rotating recording medium and the reflected light from the bottom surfaces of the pits is large.

Another object of the invention is to provide an apparatus for optically reproducing an information signal from a rotating recording medium on which a reference signal has been recorded at the central position between the centerlines of mutually adjacent track turns of the information signal. In the reproducing apparatus of the invention, the recorded information signal and the recorded reference signal can be reproduced with a single reproducing light beam. This reproducing apparatus has beans for carrying out tracking control of the reproducing light beam in response to the reproduced reference signal so that the center of the reproducing light beam coincides with the center of the information signal track.

Other objects and further features of the invention will become apparent from the following detailed description when read in conjunction with the accompanying drawings.

BRIEF DESCRIPTION OF THE DRAWINGS

FIGS. 2(A) through 2(D) are signal waveform diagrams respectively for describing the operation of the recording apparatus shown in FIG. 1;

FIGS. 3A and 3B are fragmentary plan views respectively showing in successive enlargements exemplary track patterns recorded on the original disc, by the recording apparatus illustrated in FIG. 1;

DETAILED DESCRIPTION

Figure 1:
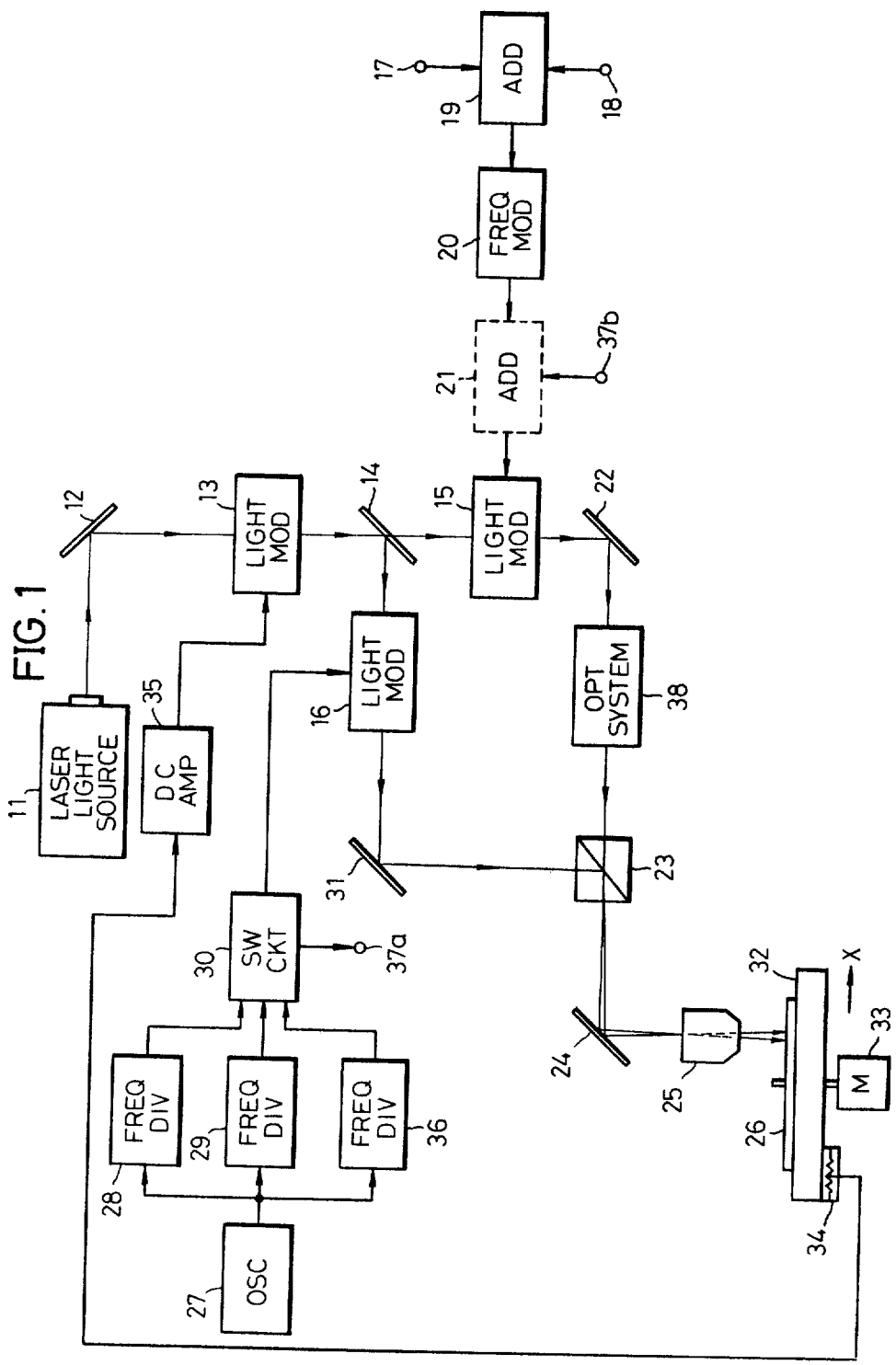
FIG. 1 is a block diagram of one example of an apparatus for recording signals on an original disc of a rotary recording disc to be reproduced by an optically reproducing apparatus according to the invention.

FIG. 1 shows one example of the apparatus for recording a signal on an original disc of a rotary recording disc. A laser light beam is emitted from a laser light source 11 and is reflected by a mirror 12 through a light modulator 13 for adjustment of the light quantity. The adjusted light beam is projected onto a half mirror 14, which transmits one part of the light to a light modulator 15 and reflects another part thereof to another light modulator 16.

Information signals which are to be recorded such as a color video signal and a frequency modulated audio signal having a frequency band outside that of the video signal, are supplied through input terminals 17 and 18 to an adder 19. The color video signal is indicated in FIG. 2(A) with a unit of a vertical syncronizing pulse 40, and in FIG. 2(D) with a unit of the horizontal synchronizing pulse 41. Frequency modulator 20 modulates the added output of the adder 19 on a carrier wave. The resulting frequency-modulated signal is supplied as a main information signal to the light modulator 15 which modulates the light beam transmitted through the half mirror 14. The frequency-modulated signal has a carrier wave center frequency of 7.0 MHz and has a frequency deviation width of 2.2 MHz. The resulting output is projected as a first modulated light beam onto a mirror 22. After the light beam is reflected by the mirror 22, it passes through a specific optical system 38 including cylindrical lenses, a slit plate, and other parts and is rendered into a light beam of a narrow rectangular cross section. The light beam which has thus passed through the optical system 38 passes through a polarizing prism 23 to a mirror 24, and an objective lens 25. The beam is brought to a focus on a photosensitive agent coating an original recording disc 26 made of material such as glass.

On the other hand, a reference oscillator 27 produces an output signal of 3.58 MHz synchronized with a color subcarrier of the color video signal. This output signal is frequency divided by 1/5 and 1/7, for example, at frequency dividers 28 and 29, respectively. These divided frequencies are reference signals (hereinafter referred to as pilot signals) for tracking control of a frequency fp1 (of 716 KHz) and a frequency fp2 (of 511 KHz). The signal from the oscillator 27 is frequency divided by 1/13 into a pilot signal of frequency fp3. Accordingly, the pilot signals of frequencies fp1, fp2 and fp3 exist in a frequency band which is lower than the frequency band of the frequency modulated information signal.

In the present embodiment of the invention, a video signal of two frames (4 fields) is recorded for every revolution of the original disc 26. The switching circuit 30 operates in the following manner. In a certain two-frame period as indicated in FIG. 2(B), the pilot signal fp1 from the frequency divider 28 is in phase synchronism with the horizontal blanking period for every period H (horizontal scanning period) as, indicated in FIG. 2(D). In the succeeding 2-frame period, the pilot signal fp2 is obtained from the frequency divider 29 in phase synchronism with the horizontal blanking period, for every period H. This operation is repeated thereafter. Furthermore, the pilot signal fp3 is obtained from the frequency divider 36, in phase synchronism with the vertical blanking period every two frames. The output pilot signals from the switching circuits 30 are supplied to the light modulator 16.

In a modification, an adder 21 indicated by an intermittent line may be provided between the frequency modulator 20 and the light modulator 15. The pilot signal of frequency fp3, from the switching circuit 30, is not supplied to the light modulator 16. It may be supplied through terminals 37a and 37b, to an adder 21 in which it is added to the frequency modulated main information signal from the frequency modulator 20. In this modification, the pilot signal of frequency fp3 is recorded at positions corresponding to the vertical blanking periods in the main information signal track.

The light beam reflected by the half mirror 14 is modulated in the light modulator 16 by the pilot signals. The resulting output is reflected by a mirror 31 is a second modulated light beam. The beam is introduced into the polarizing prism 23, where its polarization plane is angularly sifted by 90 degrees from that of the first modulated light beam. The second modulated light beam leaves the polarizing prism 23, together with the first modulated light beam. They are reflected by the mirror 24, through the objective lens 25, and focused onto the original disc 26.

The original disc 26 is mounted on a turntable 32, and rotated at a speed of, for example 900 rpm., by a motor 33. The original disc 26, turntable 32, and motor 33 are unitarily and continuously transported at a specific pitch in the arrow direction X, by means of a transporting mechanism (not shown). As a result, the main information and the pilot signals are recorded on the original disc along a spiral track progressing from its outer periphery toward its central part. These signals are respectively recorded by the first and second modulated light beams.

Furthermore, a displacement position detector 34 comprises a potentiometer which detects the displacement position due to the transporting movement of the original disc 16 and the turntable 32, as they are transported in the arrow direction X. The potentiometer produces an output DC voltage which varies responsive to the displacement position. This detected DC voltage is passed through a DC amplifier 35 to the light modulator 13. The light quantity is adjusted to control the intensity of the beam from the laser light source 11 in accordance with the radial position of the light beam spot focused on the disc 26. This arrangement and operation compensates to eliminate the effect of any difference in the relative linear speed due to the shifting position of the light beam spot along the radial direction as the track spirals in toward the center of the original disc 26.

The original disc 26 is exposed to light in the above described manner and subjected to a known developing process. A developed original disc 26a is thus obtained.

In FIG. 3A, the developed original disc 26a has a track formed in a spiral path. One portion within its circular shape is shown enlarged in FIG. 3B. In FIG. 3B, successive turns of the single continuous spiral track, on the original disc 26a are designated as t1, t2, t3 .... Each track segment is constituted by the formation of pits 51 of the main information signal. With respect to one track t1, during every period H, at a position (H.BLK) corresponding to the horizontal blanking period, pits 52 of the first pilot signal fp1 are formed on one lateral side of the track as viewed in the track path direction (for example, on the right hand side in the direction of rotation). Pits 53 of the second pilot signal fp2 are formed on the other side (left hand side) of the track. With respect to the adjacent track t2, the pits 53 of the second pilot signal fp2 are formed on one side (right hand side) as viewed in the track path direction at a position corresponding to the horizontal blanking period during every period H. On the other side (left hand side), the pits 52 of the first pilot signal fp1 are formed. Thus, the positions at which the pits 52 and the pits 53 of the first and second pilot signals fp1 and fp2 are formed are alternately reversed in the disc radial direction.

In addition, pits 54 of the third pilot signal fp3 are formed in the position (V.BLK) corresponding to the vertical blanking period which coincides with the parts where the individual track turn designation numbers change.

In the present embodiment of the invention, the pilot signal pits 52 and 53 are formed at only the position H.BLK within one period H. They are not formed at other parts 55, but the pits 52 and 53 may also be formed in these parts 55.

Figure 5:
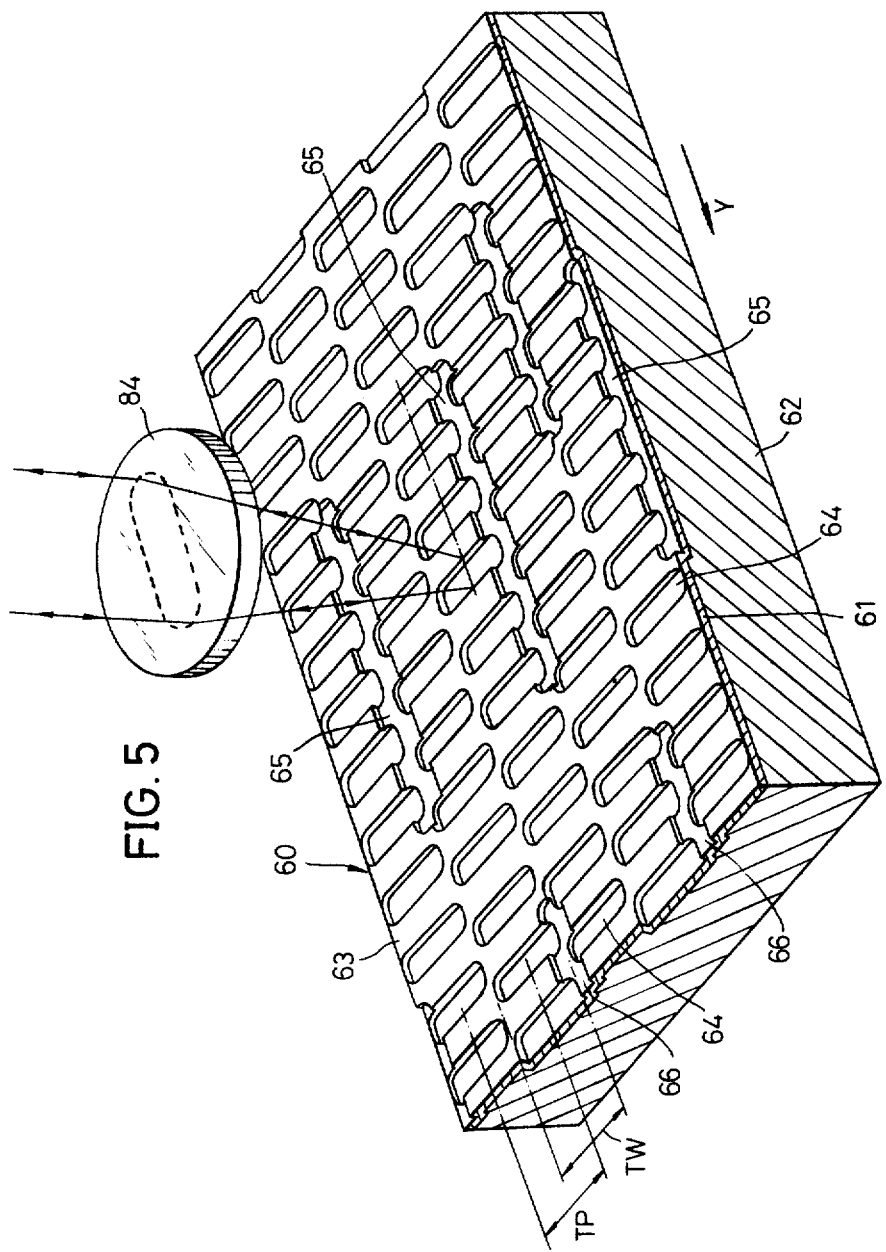
FIG. 5 is a greatly enlarged, partial perspective view for a description of the state of projection of a reproducing light beam onto a rotating recording medium.

One part of a recorded disc 60 obtained by a known disc producing or fabricating process by using the above mentioned developed original disc 26a is shown in a greatly enlarged perspective view in FIG. 5. The recorded disc 60 illustrated in FIG. 5 is constituted as one of reflection type. One example of the process of producing the disc 60 comprises depositing by evaporation deposition an aluminum film 61 of a thickness of the order of 1,000 Å on the surface of concavities and convexities of a transparent polyvinyl chloride disc of a thickness of the order of 1 mm. whose concavities and convexities have been formed to conform to those of the original disc 26a, applying as a further coating a protective thin film 62 of a thickness of the order of 0.1 mm. on the surface thus covered with the aluminum film 61, forming a second polyvinyl chloride disc of identical character, and bonding together the protective thin films 62 of these two discs with an adhesive thereby to obtain the disc 60. The evaporation deposited aluminum film 61 functions as a reflecting film. It should be mentioned that the substrate disc of the polyvinyl chloride should appear above the evaporation deposite aluminum film 61 in FIG. 5 but has been omitted.

The track of the disc 60 is formed by pits 64 with respect to a flat surface 63. In the present embodiment of the invention, the pits 51 are formed so that one of the edge lines of each track is substantially coincident with the nearest edge line of the adjacent track. That is, the adjacent tracks t1, t2, t3, ... are formed so that they are successively contiguous. Accordingly, the track pitch TP is substantially equal to the track width TW. At central positions which are approximately intermediate between the centerlines of the mutually adjacent tracks, first and second pilot signal pits 65 and 66 corresponding to the pits 52 and 53 are formed with overlapping on two tracks adjacent each other.

Thus, a disc to be reproduced by the apparatus of the invention has closely disposed recording track turns, and unrecorded bands do not exist between adjacent track turns. For this reason, the efficiency of recording surface utilization is high. Furthermore, as mentioned hereinabove, the pilot signal pits are partially overlapping the information recorded track, and parts exclusively for the pilot signal track are unnecessary. For this reason, there is no adverse effect whatsoever on the efficiency of utilization for the information signal due to the recording of the pilot signal. In this connection, the adjacent recorded track turns of the information signal may also be formed so as to be mutually overlapping partially along their lateral edges.

Figure 4:
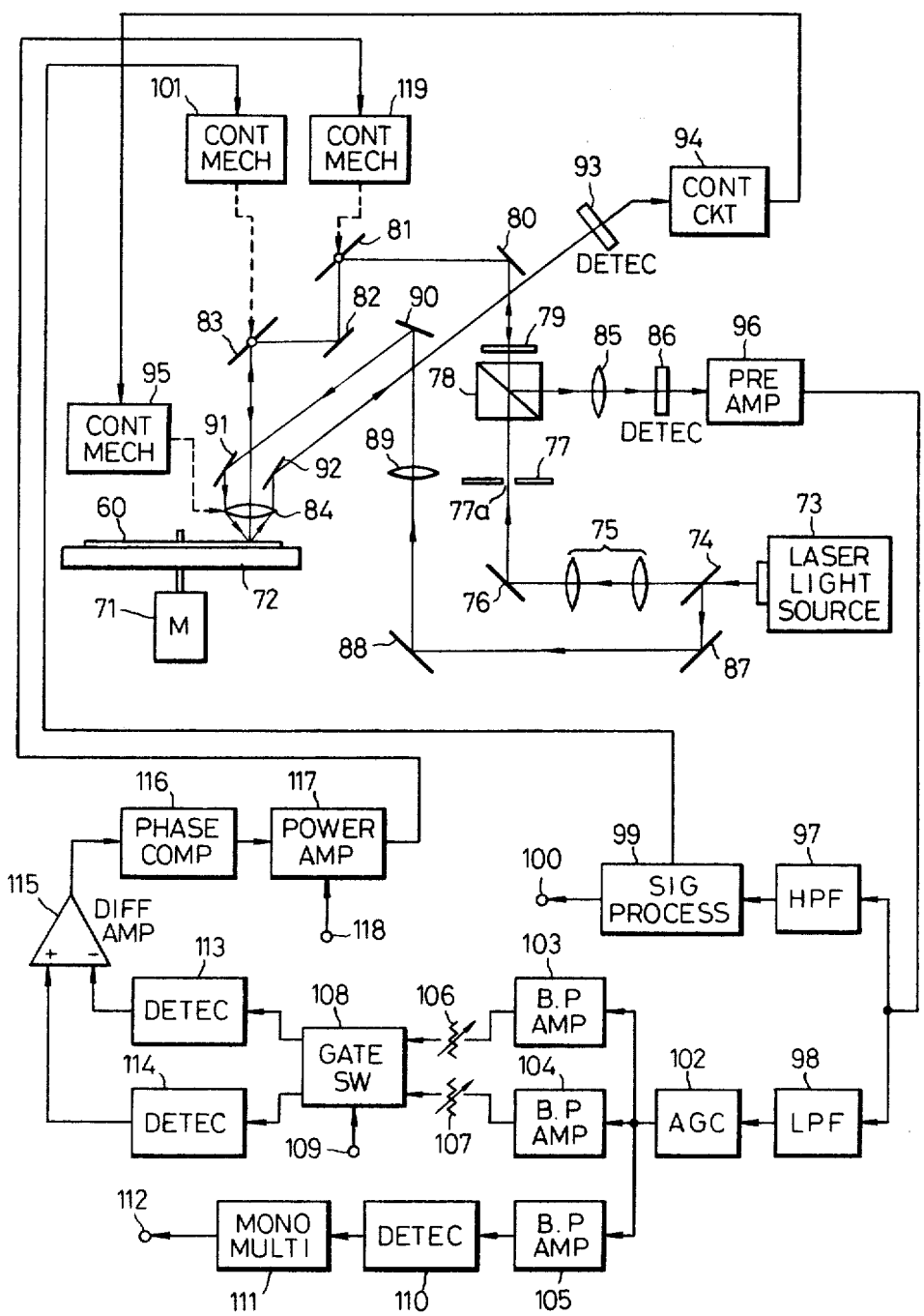
FIG. 4 is a block system diagram of one embodiment of the optically reproducing apparatus according to the invention.

One embodiment of the reproducing apparatus of the present invention for reproducing the above described disc 60 will now be described with reference to FIG. 4. The disc 60 is placed on and rotates together with a turntable 72 at a rotational speed of 900 rpm., the turntable 72 being driven by a motor 71.

A laser light beam emitted from a laser light source 73 is transmitted through a half mirror 74 and, after passing through a lens system 75, is reflected by a mirror 76 to be projected onto a slit plate 77. As a result of its passing through a slit 77a of the slit plate 77, this laser light beam is caused to have a narrow rectangular cross section. The light beam which has thus passed through the slit plate 77 then passes through a polarizing prism 78 and a λ/4 plate 79 and is successively reflected by a mirror 80, a mirror 81 for tracking control, a mirror 82, and a mirror 83 for jitter correction. Thereafter, the light beam passes through an objective lens 84 and is projected as a single light beam for reproducing onto the disc 60.

Then, since this light beam entering as incident light into the objective lens 84 has been caused to have a cross section of a substantially narrow rectangular shape by the above mentioned slit plate 77, the light beam projected through the objective lens 84 onto the disc 60 has a cross sectional of a narrow rectangular shape which substantially resembles the shape of each information signal pit 64 and extends in the track width direction, as shown in FIG. 5. The lateral width of the spot of this beam projected on the track is substantially the same as the lateral width TW of the track. As a result, with a single light beam for reproducing, one information signal track is reproduced in an excellent manner, and, at the same, the first and second pilot signals recorded in overlapped state on the two edge portions of the information signal track are also reproduced.

The light beam thus reflected by the disc 60 again passes through the objective lens 84, is reflected by the mirrors 83, 82, 81, and 80, is deflected in its direction of advance by the polarizing prism 78, passes through a lens 85, and is introduced as incident light into a detector 86. Reproduced signals are obtained from the detector 86. Since the light beam which is projected onto the disc 60 traces over the information signal pits 64 and the first and second pilot signal pits 65 and 66, the reproduced signals from the detector 86 include the reproduced information signal and, in addition, the first and second pilot signals.

On the other hand, a portion of the light beam from the laser light source 73 is reflected by the half mirror 74, is reflected by mirrors 87 and 88, passes through a lens 89, and, after being reflected by mirrors 90 and 91, is passed through the objective lens 84 to be projected onto the disc 60. The light beam thereby reflected by the disc 60 again passes through the lens 84 and, after being reflected by a mirror 92, is introduced as incident light into a detector 93. A control circuit 94 operates in response to the resulting output of this detector 93 to form a control signal. A control mechanism 95 operates in response to this control signal to control the height position of the objective lens 84 relative to the disc 60, whereby automatic focus control of the objective lens 84 is accomplished.

The reproduced signal from the detector 86 is supplied through a pre-amplifier 96 to a high-pass filter 97 and a low-pass filter 98. As a consequence, an information signal component is obtained from the high-pass filter 97 and supplied to a signal processing circuit 99, where it is demodulated, whereby the reproduced information signal is led out through an output terminal 100. At the same time, jitter is detected in the signal processing circuit 99, and a control signal responsive to this jitter is supplied to a control mechanism 101, which thereby operates to control the angle of the mirror 83 for jitter correction so as to eliminate the jitter.

Figure 6:
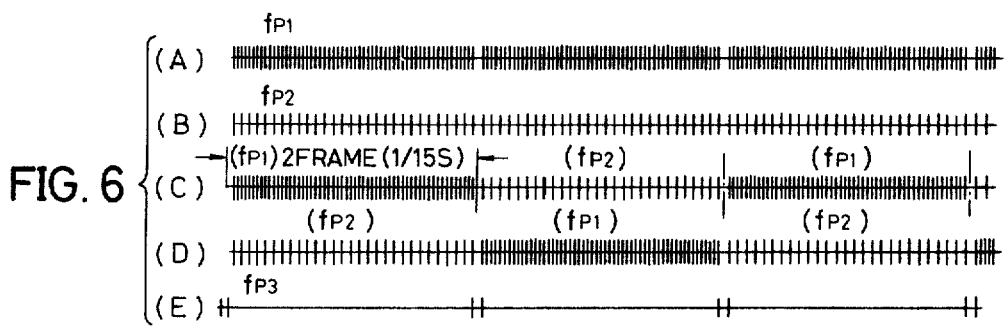
FIGS. 6(A) through 6(E) are graphs respectively for a description of signals at various parts of the apparatus shown in block diagram form in FIG. 4.

On the other hand, reference signals are obtained from the above mentioned low-pass filter 98 and supplied through an automatic gain control (AGC) circuit 102 respectively to amplifiers 103, 104, and 105. Here, the amplifiers 103, 104 and 105 are band-pass amplifiers respectively having steep passing frequency characteristics at only the frequencies fp1, fp2, and fp3. The first and second reference signals fp1 and fp2 shown in FIGS. 6(A) and 6(B) are obtained separately from the amplifiers 103 and 104, respectively. These signals pass through level adjustors 106 and 107, where their levels are adjusted. The resulting signals are then supplied to a gate switching circuit 108.

A third reference signal, shown in FIG. 6(E), is obtained from the amplifier 81 and supplied to a detecting circuit 110. The resulting output signal is supplied to operate a monostable multivibrator 111. The monostable multivibrator 111 does not respond to noise components. The output signal thereof is derived from an output terminal 112.

In a normal reproducing mode, the output signal from the terminal 112 is applied to trigger a flip-flop circuit (not shown). The output signal of the flip-flop circuit is a switching pulse applied, through an input terminal 109, to a gate switching circuit 108. In a special reproducing mode (such as still picture reproducing mode or slow motion picture reproducing mode), the signal from the terminal 112 is applied to a kick-back pulse forming circuit (not shown) whose output kick-back pulse is applied to a terminal 118.

The gate switching circuit 108 switches the pilot signal fp1 and fp2 every revolution period of the disc 60 in response to the switching pulse supplied through the terminal 109. The disc rotational speed in the present embodiment of the invention is 900 rpm. Therefore, two frames of the video signal are recorded for each revolution of the disc 60. As a result, a switching pulse inverts polarity every two frames (1/15 second). The gate switching circuit 108 supplies a signal as indicated in FIG. 6(C) and a signal as indicated in FIG. 6(D), respectively, to detecting circuit 113 and 114.

The detecting circuits 113 and 114 detect the envelopes of their respective input reference signals and convert the envelopes into DC voltages. These voltages are then supplied to the input terminals of a differential amplifier 115. This differential amplifier 115 compares the output signals of the two detecting circuits 113 and 114 which vary in response to the reproduced levels of the reference signals fp1 and fp2. This generates an output tracking error signal which indicates the tracking error direction and quantity.

This output error signal passes through a phase compensation circuit 116 and is supplied to a power amplifier 117, where the signals are amplified to a specific power. The resulting output of the power amplifier 117 is applied to the tracking control mechanism 119. The tracking control mechanism 119 thereupon operates responsively to control the angle of the mirror 81 for tracking control. As a result, tracking control is so accomplished that the reproduced levels of the first and second reference signals become equal, that is, that the reproducing light beam traces accurately and positively along the information signal track turns.

While, in the above described embodiment of the invention, the disc 60 is adapted to be of a light reflecting type, the disc 60 is not thus limited and may be of the light transmitting type.

Next, description will be given with respect to the relationship between the depth of focus of the objective lens 84 and the focusing position with respect to the disc.

Figures 7, 9:
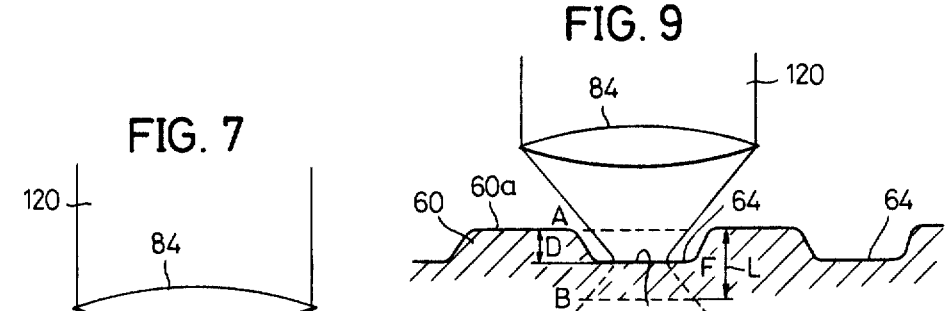
FIG. 7 is a diagram for explaining the depth of focus of the objective lens shown in FIG. 4.
FIGS. 8 and 9 are diagrams for respectively explaining different examples of focusing states of the objective lens.

Generally, there are several definitions for the focusing depth of a lens. In the present specification and appended claims, the depth of focus refers to a distance L between positions A and B where the diameter of a parallel light beam 120 which passes through the lens 84 and focuses at a focusing point F, becomes $\sqrt{2}$ times the diameter of the light beam at the focusing point F, as shown in FIG. 7. The positions A and B are at the forward and backward positions with respect to the focusing point F, along the progressing direction of the light beam. At the above positions A and B, the cross-sectional area of the light beam is twice that at the focusing point F. Accordingly, the power density of the light beam at the positions A and B, is one-half that at the focusing point F.

Figures 8, 10:
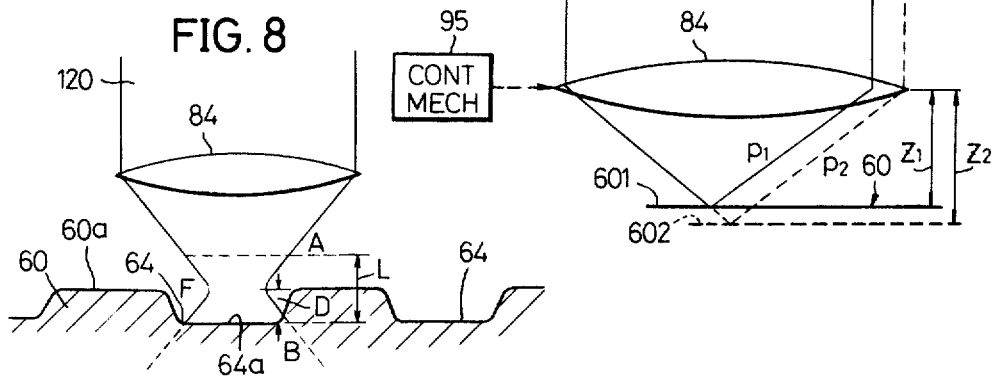
FIG. 10 is a diagram for explaining adjustment of the automatic focusing control position of the objective lens.

In the apparatus according to the present invention, the depth of focus L of the lens 84 and the position of the focusing point F, are selected as shown in FIG. 8. That is, the depth of focus L of the lens 84 is selected to twice a depth D of the pit 64 of the disc 60. In the present embodiment of the invention, the depth D of the pit 64 is 0.4 μm, and the depth of focus L is 0.8 μm. It is sufficient to set the depth of focus L to a value approximately equal to or smaller than the depth D of the pit 64. The position below the focusing point, coincides with the height position of an upper surface 60a of the disc 60, as shown in FIG. 8. Hence, the height position of the position B coincides with that of a bottom surface 64a of the pit 64.

By setting the depth of focus L and the position of the focusing point F as described above, the luminous energy of the beam reflected at the upper surface 60a of the disc 60 and reaching the detector 86 becomes maximum. On the other hand, at the bottom surface 64a of the pit 64, the beam is de-focused and reflected irregularly. Accordingly, not all the beam reflected at the bottom surface 64a travels back the same light path as the incident light path. Thus, the luminous energy of the beam reflected at the bottom surface 64a of the pit 64 and reaching the detector 86 is small. Therefore, if the relationship between the depth of focus L and the depth D of the pit, and the position of the focusing point F are selected as shown in FIG. 8, the difference in the luminous energy between the reflected beam from the upper surface 60a of the disc and the reflected beam from the bottom surface 64a of the pit 64, respectively reaching the detector 86, becomes maximum, and fine reproduction can be performed.

When an objective lens having a depth of focus L larger than twice the depth D of the pit 64, or when the height position of the focusing point F of the lens 64 is selected at an intermediate position between the upper surface 60a of the disc 60 and the bottom surface 64a of the pit 64, the difference in the luminous energy between the beams reflected at the disc upper surface 60a and the pit bottom surface 64a becomes small or equal to zero. Hence, in this case, a large second-order harmonic distortion is introduced, and fine reproduction cannot be performed. However, in the apparatus according to the present invention, the depth of focus L and the position of the focusing point F are selected as described above, and fine reproduction can be performed without introducing such inconveniences.

Another embodiment in which the above depth of focus L and the position of the focusing point F are selected differently, is shown in FIG. 9. In this embodiment, the depth of focus L of the lens 84 is selected to twice the depth D of the pit 64 of the disc 60 as in the above described embodiment, and the focusing point F is at a height position coinciding with the height position of the bottom surface 64a of the pit 64. Hence, the position A is at the same height position as the upper surface 60a of the disc 60. Although the polarity of the output signal obtained reverses as compared to the embodiment shown in FIG. 8 when the depth of focus L and the position of the focusing point F are selected in this manner, the same effect is obtained as in the case of the above embodiment shown in FIG. 8.

In the above described embodiment shown in FIGS. 8 and 9, it is not always necessary for the position of the focusing point F to accurately coincide with the disc upper surface 60a and the pit bottom surface 64a. The focusing point F may be positioned slightly above the disc upper surface 60a and slightly below the pit bottom surface 64a.

Next, description will be given with respect to the method for adjusting the height position of the lens 84 to the above height positions, by referring to FIG. 10. In FIG. 10, the illustration of the mirror 92 shown in FIG. 4 is omitted, in order to simplify the illustration and explanation.

When the detector 93 is at a position indicated by x1 in FIG. 10, a sub-beam for focusing control which has passed through the lens 84 when the upper surface of the disc 60 is at a height position indicated by 601 reaches the detector 93 by passing through a light path P1. Accordingly, when the detector 93 is at the position x1, the height position of the lens 84 with respect to the disc upper surface is controlled so that the distance between the disc upper surface 601 and the lens 84 becomes Z1, by the control mechanism 95 of the above focusing control system. On the other hand, when the position of the detector 93 is moved to a position indicated by x2, a sub-beam which has passed through the lens 84 when the upper surface of the disc 60 relatively is at a height position indicated by 602 with respect to the lens 84 reaches the detector 93 by passing through a light path P2. Accordingly, when the detector 93 is at the position x2, the height position of the lens 84 with respect to the disc upper surface is controlled so that the distance between the disc upper surface 602 and the lens 84 becomes Z2, by the control mechanism 95. FIG. 10 is shown as though the height of the lens 84 is constant, and the upper surface of the disc 60 varies. However, in reality, the height of the upper surface of the disc 60 is constant, and the relative height of the lens 84 with respect to the disc upper surface varies.

Therefore, by finely adjusting the position of the detector 93, it is possible to adjust the position below the focusing point of the lens 84, to the height positions indicated in FIGS. 8 and 9.

Further, the present invention is not limited to these embodiments, but various variations and modifications may be made without departing from the scope of the present invention.

What is claimed is:

1. An apparatus for optically reproducing signals recorded on a rotating recording medium, said signals comprising an information signal recorded along track turns disposed in a mutually side-by-side arrangement on the recording medium and at least one kind of reference signal recorded along the track turns and in the central part between the centerlines of mutually adjacent track turns, said reference signals overlapping the lateral edges of said adjacent track turns of the information signal, said information signal being recorded in a form of a succession of pits formed on a substantially flat surface of the recording medium, the depth of said pits being substantially uniform, said apparatus comprising:

means for producing a first light beam;
means for producing a second light beam;
optical system means for projecting said first and second light beams to form spots on the surface of said recording medium so that the light beams are reflected from said surface of said recording medium, said optical system means receiving said first and second light beams as they are reflected from said surface of said recording medium, the width in the track transverse direction of the first light beam spot on the recording medium being substantially the same as the transverse width of each of said track turns, said optical system means including an objective lens having a depth of focus which is substantially equal to or less than two times said uniform pit depth;

first detecting means for detecting said reflected first light beam to produce a reproduced signal which comprises a reproduced information signal and at least one reproduced reference signal;

means for separating the reproduced reference signal from the reproduced signal and for producing a tracking control signal in response to the reproduced reference signal;

tracking control means responsive to said tracking control signal for controlling the optical system means so that the center of the first light beam spot follows along the centerline of each of said track turns;

second detecting means for detecting said reflected second light beam to produce a focus control signal; and focus control means responsive to said focus control signal for controlling the distance of said objective lens with respect to the recording medium so that said first light beam is focused on approximately said substantially flat surface of the recording medium or on bottoms of the information signal pits.

2. An optically reproducing apparatus as claimed in claim 1 in which: the reference signal comprises first, second, and third reference signals of respectively different frequencies, the first and second reference signals being changed over and recorded alternately ever track length corresponding to one revolution of the recording medium, the third reference signal being recorded at positions corresponding to the changing over of the first and second reference signals; and the means for producing the tracking control signal comprises means for separating the first, second, and third reference signals from each other, means for operating in response to the third reference signal thus separated to change over and obtain alternately the separated first and second reference signals at every track turn, means for detecting the first and second reference signals thus obtained, and means for producing the tracking control signal in response to the resulting output of the detecting means.

3. An optically reproducing apparatus as claimed in claim 2 in which the information signal is a video signal, and the first and second reference signals are recorded at positions corresponding to the horizontal blanking periods of the video signal of the track.

4. An optically reproducing apparatus as claimed in claim 2 in which the information signal is a video signal, and the third reference signal is recorded at positions corresponding to the vertical blanking periods of the video signal of the track.

5. An optically reproducing apparatus as claimed in claim 1 in which the optical system includes a slit plate having a slit for regulating the cross-sectional shape of the light beam from the means for producing the first light beam, said cross-sectional shape being a narrow oblong shape which extends in the track transverse direction when said objective lens projects said light beam onto the substantially flat surface of the recording medium and tracking control mirror means which reflects the light beam passed through the slit plate and which has a reflection angle controlled by the tracking control means, said objective lens projecting onto the recording medium the light beam thus reflected by the mirror means.

6. An optically reproducing apparatus as claimed in claim 1 in which said means for producing the second light beam comprises second optical system means for producing the second light beam by separating a portion of the light from said means for producing the first light beam.

* * * * *

UNITED STATES PATENT AND TRADEMARK OFFICE
CERTIFICATE OF CORRECTION

PATENT NO. : 4,486,791
DATED : December 4, 1984
INVENTOR(S) : Yoshiyo Wada, et al.

It is certified that error appears in the above-identified patent and that said Letters Patent is hereby corrected as shown below:

Claim 2, Column 11, line 29, change "ever" to --every--.

Claim 6, Column 12, line 34, between "light" and "from" insert --beam--.

Signed and Sealed this

Nineteenth Day of November 1985

[SEAL]

Attest:

DONALD J. QUIGG

Attesting Officer

Commissioner of Patents and Trademarks